United States Patent [19]

Bell, Jr. et al.

[11] 4,156,706

[45] May 29, 1979

[54] FAN CYLINDER HAVING INVISIBLE EASED INLET

[75] Inventors: Samuel W. Bell, Jr.; Verne S. Stevenson, both of Shawnee Mission, Kans.

[73] Assignee: The Marley Cooling Tower Company, Mission, Kans.

[21] Appl. No.: 859,828

[22] Filed: Jan. 16, 1978

[51] Int. Cl.² ............................ F28C 1/04; F15D 1/06
[52] U.S. Cl. ..................................... 261/109; 261/30; 261/DIG. 11; 165/DIG. 1; 415/219 R
[58] Field of Search .................... 261/DIG. 11, 24, 30, 261/109; 165/DIG. 1; 415/208, 216, 219 R

[56] References Cited

U.S. PATENT DOCUMENTS

| | | | |
|---|---|---|---|
| 1,390,237 | 9/1921 | Conder | 415/208 |
| 1,935,216 | 11/1933 | Sievert | 415/208 |
| 1,962,100 | 6/1934 | Bryan | 261/30 |
| 2,355,619 | 8/1944 | Bossart | 415/219 |
| 2,668,523 | 2/1954 | Lamb | 415/219 R |
| 2,672,328 | 3/1954 | Mart et al. | 261/DIG. 11 |
| 2,680,603 | 6/1954 | Taylor | 261/DIG. 11 |
| 2,706,472 | 4/1955 | Sims | 415/219 |
| 3,052,105 | 9/1962 | Bowman et al. | 261/DIG. 11 |
| 3,299,619 | 1/1967 | Terry | 261/DIG. 11 |
| 3,445,093 | 5/1969 | Reder | 261/24 |
| 3,780,999 | 12/1973 | Fordyce | 261/109 |
| 3,873,052 | 3/1975 | Bockau et al. | 415/219 R |
| 3,937,189 | 2/1976 | Beck | 415/219 R |

FOREIGN PATENT DOCUMENTS 1551401 10/1970 Fed. Rep. of Germany .... 165/DIG. 1

*Primary Examiner*—Frank W. Lutter
*Assistant Examiner*—Gregory N. Clements
*Attorney, Agent, or Firm*—Schmidt, Johnson, Hovey & Williams

[57] ABSTRACT

Air moving mechanism is provided for equipment such as direct or indirect heat exchange cooling towers. Conventional cross-sectionally elliptical eased inlet structure leading to a fan opening or cylinder surrounding a rotary fan air mover is replaced by a much simpler, less costly, apertured airflow modifying baffle member which functions to define an invisible eased inlet for the fan. The specially shaped aperture in the baffle member is configured and arranged relative to the fan cylinder inlet to cause air removed from the tower casing and directed toward the fan to follow a transition path between the baffle member and fan opening or cylinder which generally conforms to and substantially fills the opening or cylinder inlet around the entire circumference thereof. In those instances where air enters the tower casing on one side, or on opposed sides of the fan structure only, the orifice in the baffle is formed of somewhat rectangular shape with edge portions thereof aligned with the air inlet sections of the tower in greater spaced relationship from the axis of the fan opening or cylinder than the remaining edge portions of the aperture to compensate for the more radial airflow patterns toward the cylinder or opening from the parts of the tower which receive ambient air as contrasted with the axially oriented airflow toward the fan cylinder or opening from the closed parts of the tower casing.

24 Claims, 17 Drawing Figures

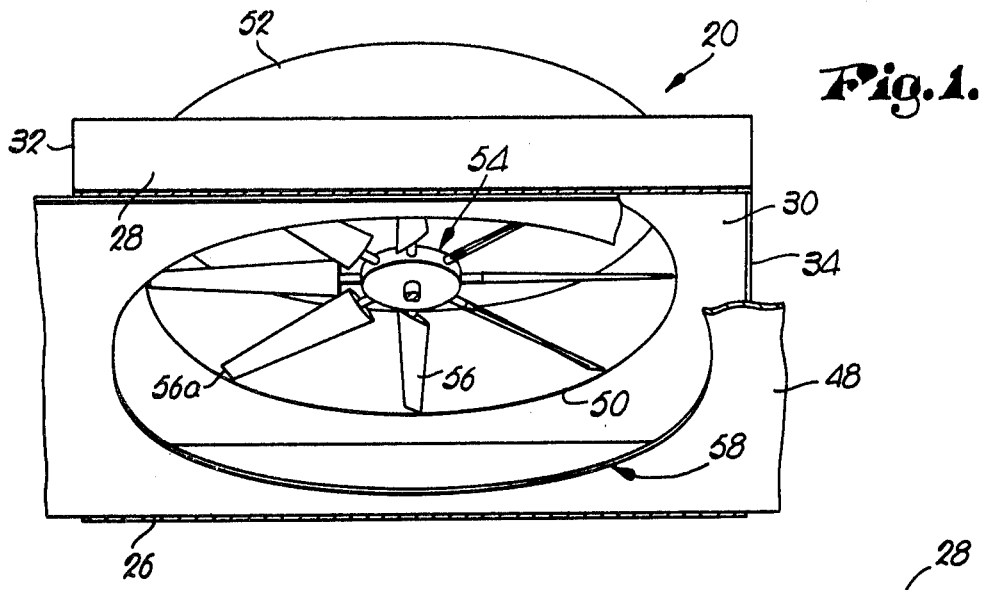
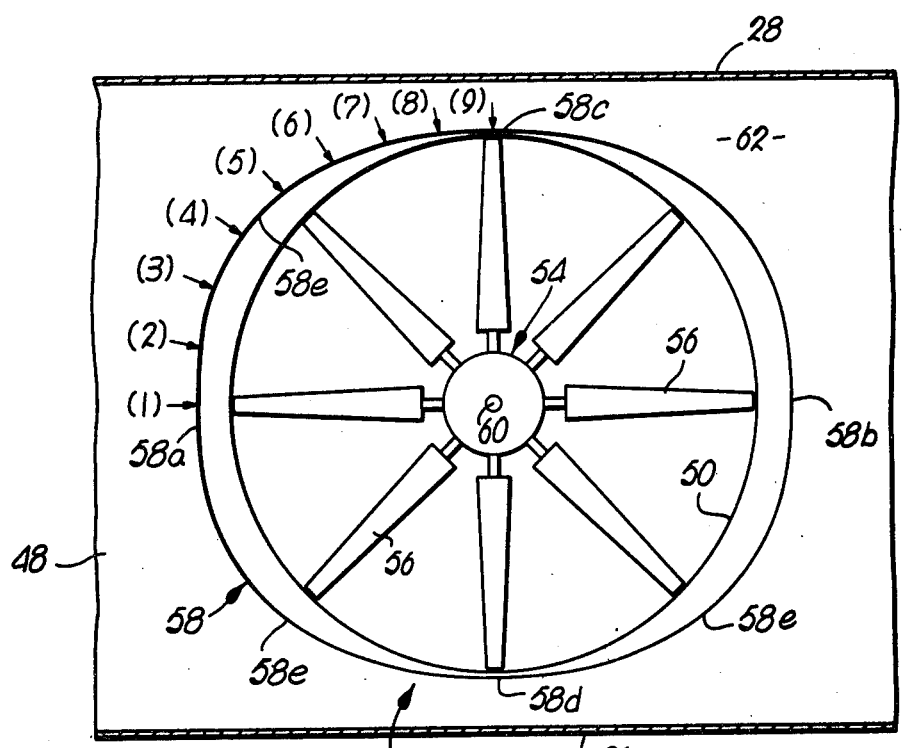
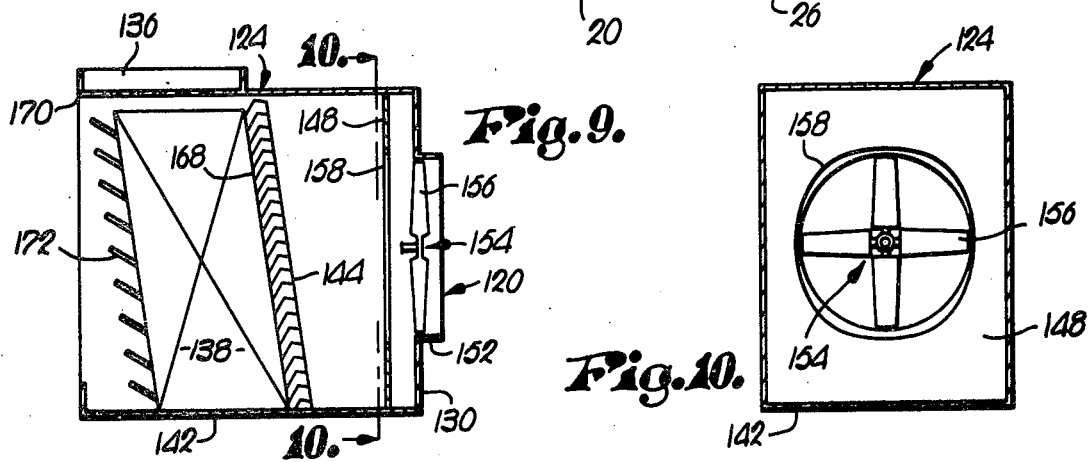

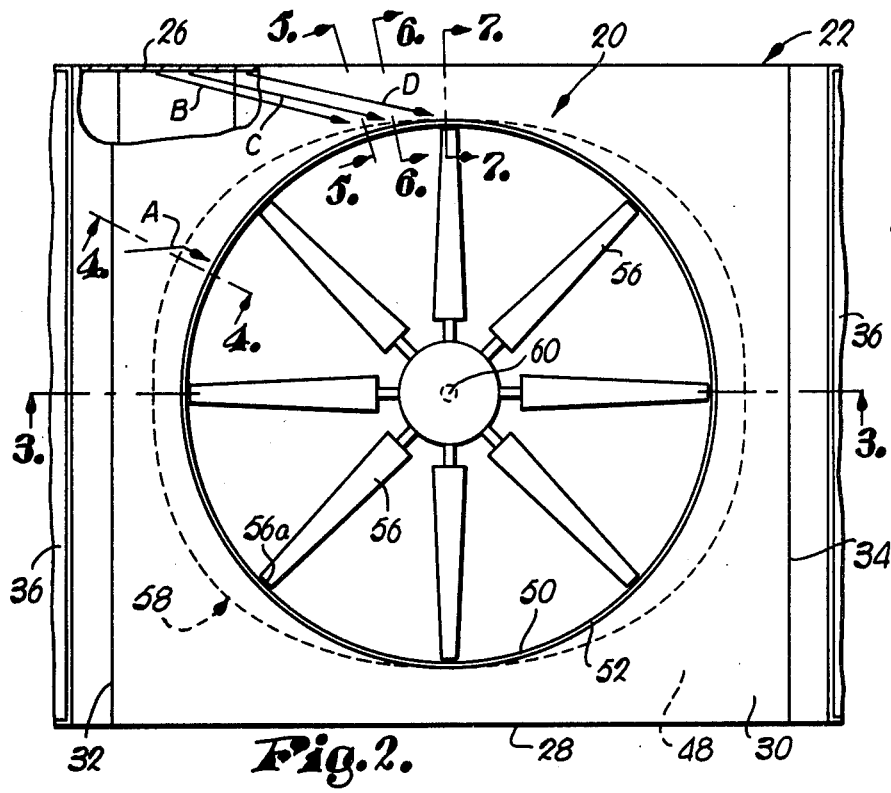
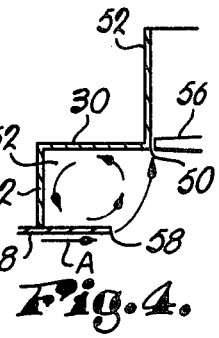
Fig.4.
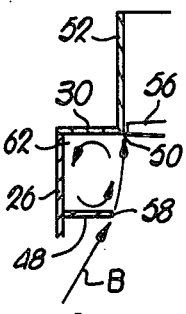
Fig.5.
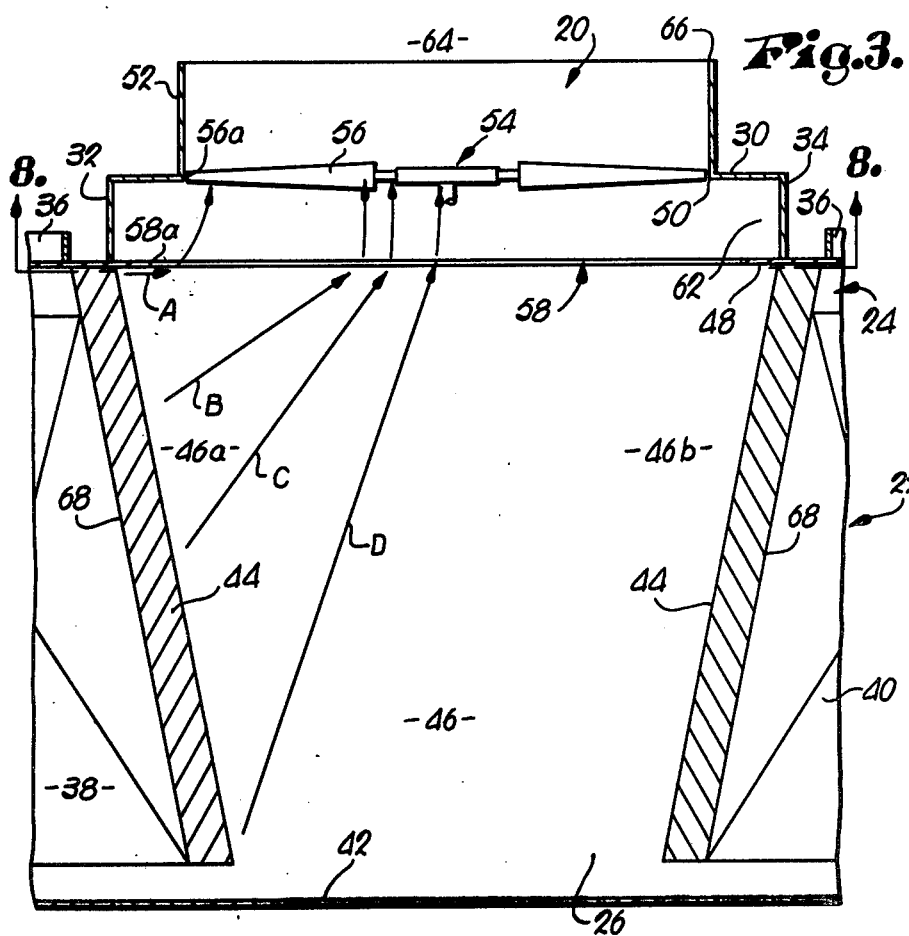
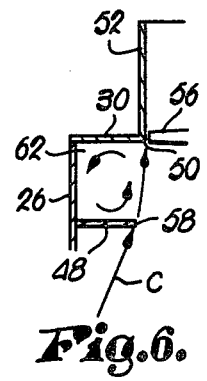
Fig.6.
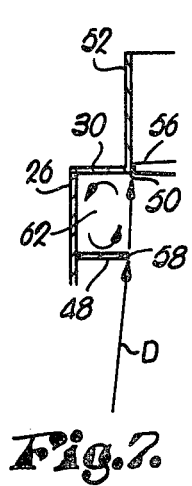
Fig.7.

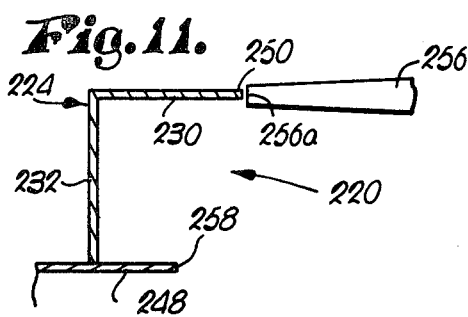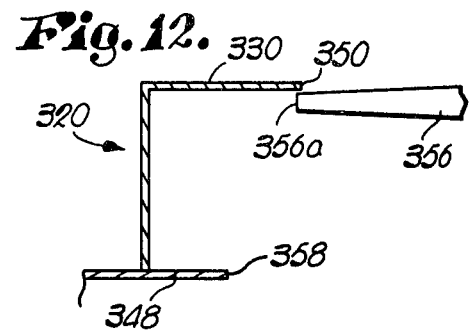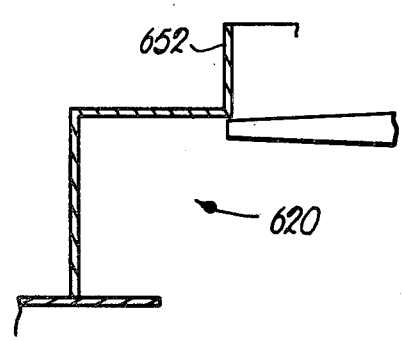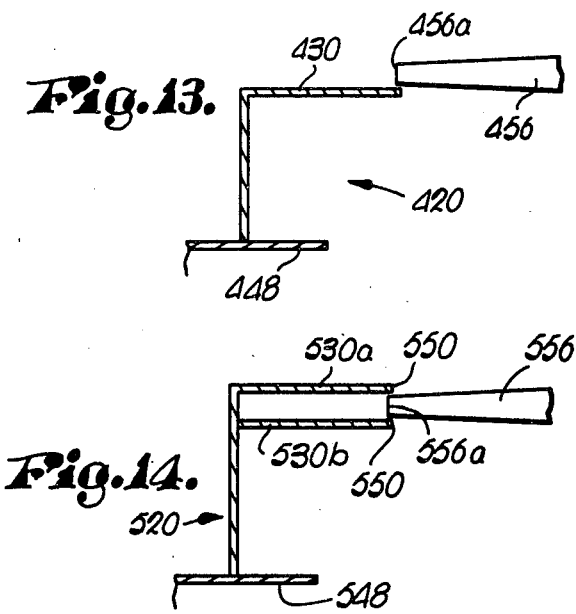

FAN CYLINDER HAVING INVISIBLE EASED INLET

This invention relates to air moving mechanism of the type which has particular utility in heat exchange equipment and provides increased operating efficiency at lower cost for units such as induced draft direct or indirect cooling towers.

Heat exchangers of the finned tube type as well as evaporative water cooling towers have long used direct and induced draft fan assemblies for directing cooling air through the heat exchange zones of the apparatus to increase thermal interchange at minimum cost and in the least amount of space. Most evaporative water cooling equipment initially depended upon convective air currents enhanced by stacks which depended on natural draft for air movement. This required the fabrication of extremely high chimneys to produce dependable air movement under varying ambient conditions, particularly in geographical area where high temperatures were encountered for critical or extended periods of time. Also, as fan and electric motor designs became more efficient and dependable, means was presented for moving cooling air through the evaporative or dry thermal exchange sections of the cooling apparatus on demand, at predetermined flow rates and volumes, and at feasible operating costs. Furthermore, the use of fan driven air currents through the cooling units permitted fabrication of compact apparatus which not only could be sized accurately for particular thermal requirements, but also allowed location thereof in advantageous positions for optimum cooling without creating attendant aesthetic problems.

Although for the most part forced draft fans were initially used to direct cooling air through evaporative and dry thermal interchange sections, induced draft fan mechanisms are used primarily today because of greater effectiveness attributable to the more uniform air distribution which is obtained over the entire area of the cooling section, and improvement in recirculation resistance inherent in designs which force the hot air away from the inlet of the cooling equipment to the greatest possible extent.

Squirrel-cage type centrifugal blowers have found application in many types of evaporative or dry surface cooling towers because of their quiet operation and ability to impart the necessary velocity to the air entering the units. However, rotary fans having a series of radial blades have found greatest acceptance because of their ability to deliver large volumes of air at low static head (nominal ¾ in. water or less). Propeller fans are used almost exclusively on large towers for outdoor installations because of their lower cost than other types of air moving devices, and the fact that they may be used on any size tower and are particularly suited to cooling tower usage where low draft losses prevail. Properly designed fan cylinders having propeller fans therein operate at efficiencies as high as 80%. Typically, fans of this type will have diameters ranging from about 2 feet up to 30–40 feet.

In a conventional evaporative water cooling tower of the induced draft type, a single propeller-type fan rotatable in a fan cylinder therefor which discharges vertically into the atmosphere is located above a plenum chamber of a casing that has two opposed fill sections therein which receive air from diametrically opposed, upright air inlets. Water to be cooled is gravitationally delivered to the upper plan areas of the fills and permitted to flow downwardly therein before being collected in a cold water basin at the bottom of the tower. Air pulled into the casing of the tower intersects the gravitating water in what is termed "crossflow relationship" and then forced outwardly and upwardly through the fan cylinder mounted at the top of the tower casing. Drift eliminators over the inboard upright faces of the opposed fill assemblies serve the dual function of removing entrained water droplets from the air before discharge thereof, and turning the air from its initial essentially horizontal path to an upward vector leading in an essentially straight line toward the inlet of the fan cylinder. It can be appreciated in this respect though that the air moving in crossflow fashion through the fill assemblies adjacent the upper hot water distribution basins is moving in an essentially radial direction with respect to the fan, whereas air entering the plenum between the fill units at the lower ends thereof is more axially oriented with respect to the fan cylinder as it leaves the fill and travels toward the air outlet. The result is that the component of velocity of air parallel to the fan axis at the upper part of the casing plenum is substantially lower than that of the air coming from the bottom of the tower.

In addition, air is pulled into the tower from opposite sides of the casing and delivered to the plenum zone from upright rectangular areas in direct facing relationship, thus creating an inherent imbalance insofar as delivery of air to the circular fan and cylinder is concerned since supply of air to the perimeter of the fan unit is from different directions and non-uniform. Fan starvation can result around the circumference thereof, as well as at the inboard segments of the blade.

It has been known for a long time that smooth flow of air into a fan cylinder equally around the perimeter thereof must be provided for most efficient operation. Since air flowing essentially radially at the upper end of the tower must be turned to a greater extent than air delivered to the fan cylinder from the lower section of the casing, it can be appreciated that there would be a tendency to stall the tips of the blades unless means is provided to assure uniform transition of the air streams into the ultimate axial path thereof through the fan. Tests over the years ultimately confirmed that most efficient fan operation is assured by use of what has become known in the art as an eased inlet. But since fan performance is sensitive not only to inlet airflow conditions but also fan tip blade clearance, it necessarily follows that the inlet structure must provide for minimum clearance with the blade tips while at the same time allowing air to smoothly enter the inlet from all directions. Various configurations of fan opening structure may be advantageously employed in this respect to in effect "seal" the tips of the blades against inefficient leakage of air.

Furthermore, it is desirable although not essential to operability of this invention that the fan inlet also be accompanied by an upright or outwardly extending stack generally termed a fan cylinder which serves as an enclosure around the fan to effectively improve fan performance. It necessarily follows that a structure of substantial size must be fabricated and mounted on the tower, usually at the upper end of the casing in the case of vertical discharge, relatively large towers. Oftentimes, these cylinders can be relatively massive in size for large diameter fans (30 to 40 ft.) employed in high water volume cooling towers. In addition, in view of the fact that most industrial towers are of the multicell type wherein a long line of side-by-side fill assemblies are served by respective fan units, avoidance of hot air recirculation is an essential requirement necessitating fan cylinders of considerable height. These cylinders must not only be constructed of materials which withstand the corrosive atmospheres in which they operate, but must also be rugged enough to withstand the vibration induced by pulsating air flows. Recovery stacks for large scale industrial water cooling towers are often 15-20 feet in height where large diameter fans are utilized. The eased inlet of the fan cylinders leading to the operating area of the fan blades desirably are of a logarithmic curved configuration but for practical reasons usually are fabricated as elliptical surfaces which approximates the theoretical optimum contour.

Although curvilinear eased inlets offer operating advantages, fabrication can be expensive if other requirements such as corrosion resistance and inherent strength are satisfied for a particular application. Compound curves are difficult to fabricate using metal; and reinforced synthetic resin designs not only are costly to mold, but must be specially shaped and reinforced to provide adequate strength. Exemplary fan cylinders fabricated of wood and embodying eased inlets for improving fan performance are found in U.S. Pat. No. 2,681,178, U.S. Pat. No. 2,681,179, and U.S. Pat. No. 2,814,435, all assigned to the assignee hereof. These wooden cylinders, although corrosion resistant, were subject to deterioration over a period of time by virtue of the humid conditions under which they normally operated, and not only were costly, but not as aesthetically pleasing to the eye as desired. Glass reinforced polyester fan cylinders have, for the most part, replaced earlier wood structures but here again, although deterioration is not the problem encountered with wood, they are still subject to limitations, particularly wind damage deflection by strong wind gusts which can cause the blade tips to gouge through the inner wall of the cylinder and destroy the blade tip as well as part of the enclosure structure. Relatively high initial cost is a major deterrant to widespread usage of synthetic resin fan cylinders. Exemplary structures of this type are illustrated in the assignee's U.S. Pat. Nos. 3,708,155, and 3,780,999.

It has now been discovered that fan inlet structure may be provided for units such as wet or dry surface cooling towers which may be fabricated of corrosion resistant materials such as metal, plastics or concrete without the necessity of providing compound curves therein, all at a substantially lower cost than heretofore possible in equipment of this size, and providing optimum efficiency even in instances where airflow velocities and directions of air travel toward the fan cylinder are not equal throughout the air delivery zone. Others have disclosed fan cylinder structure which attempts to do away with the necessity of providing a compound curve eased inlet, but none of these prior efforts have addressed themselves to the need to modify the vena contracta of the airflow into the inlet so that it fully fills the fan cylinder without stalling of the blades regardless of the variations in air velocities and directions of supply thereof to the fan. An exemplary noncurved eased inlet for fans is illustrated in U.S. Pat. No. 3,814,538, depicting two cylinders interconnected by a radial flange with the fan being rotatable within one of the cylindrical segments while the other is outboard thereof in the direction of air supply. The double ring configuration of U.S. Pat. No. 3,814,538 does not allow for modification of the vena contracta of the airflow into the primary cylinder regardless of variations in airflow direction and velocities leading into the fan. Equally as important though is the fact that the structure of this patent fails to really provide smooth transitional movement of the air from the source into the fan cylinder around the full perimeter thereof without attendant blade starvation.

It is therefore the primary object of the present invention to overcome the disadvantages of the prior art and permit utilization of an easily fabricatable and relatively inexpensive right circular cylinder as an enclosure for the fan blades and utilizing an appertured baffle in a strategic position ahead of the cylinder inlet for modifying the airflow thereto in a manner to assure circumferentially uniform flow of air into the fan cylinder in substantially coaxial relationship with the axis of rotation of the fan blades.

Another important object of the invention is to provide air moving mechanism as described wherein uniform transition of air from a source into the fan cylinder is assured even in instances where the air is delivered to the fan cylinder from zones which are essentially on opposite sides of the center line of the fan, by the simple expedient of modifying the shape of the aperture in the baffle ahead of the fan to provide a generally rectangular opening which has the effect of modifying the vena contracta of the airflow to an extent that the air enters the fan cylinder substantially equally around the perimeter thereof and in generally parallel relationship to the axis of the fan. Also an important object of the invention is to provide air moving mechanism as mentioned above which may be used on cooling towers of conventional design without significant modification thereof being required, all at reasonable cost while at the same time permitting optimized fan performance. Another important object of the invention is to provide air moving mechanism for units such as cooling towers or the like wherein an invisible eased inlet for a fan cylinder is formed by simply mounting a plate ahead of the cylinder inlet with an orifice being provided in the baffle plate of a size and shape to control the vena contracta of the air delivered to the fan so as to cause the airflow entering the fan opening to be of desired circular shape thus completely filling the cylinder without stalling of the blades at any point around the perimeter of the fan cylinder. In addition, variation of the shape of the vena contracta of the flowing air may be accomplished by simply changing the relative position of the baffle with respect to the fan, or in the alternative or as an adjunct, changing the shape of the baffle orifice.

A further object of the invention is to provide air moving mechanism of the characteristics defined which is usable on various size cooling towers of either the wet or dry surface type and which may be employed in either vertical or horizontal orientation as desired and in cases where the source of air is immediately aligned with the fan opening, to one side thereof, or on opposite sides of the same.

Other objects of the invention will be explained or become evident as the following description progresses.

In the drawings:

FIG. 1 is a fragmentary perspective view of the upper part of a cooling tower showing air moving mechanism embodying the preferred concepts of the present invention, with parts thereof being broken away for clarity;

FIG. 2 is a fragmentary plan view of the cooling tower structure having air moving mechanism thereon as depicted in FIG. 1;

FIG. 3 is a fragmentary vertical cross-sectional view of the cooling tower as is shown in FIG. 2, with parts being broken away for clarity and with certain components thereof being shown schematically;

FIGS. 4, 5, 6 and 7 are fragmentary cross-sectional views taken substantially on the lines 4—4, 5—5, 6—6, and 7—7 respectively of FIG. 2;

FIG. 8 is a fragmentary horizontal cross-sectional view on the line 8—8 of FIG. 3 and looking upwardly in the direction of the arrow;

FIG. 9 is a schematic vertical cross-sectional view of another type of cooling tower on which air moving mechanism of this invention may be advantageously employed;

FIG. 10 is a vertical cross-sectional view taken on the line 10—10 of FIG. 9 and looking to the right as indicated by the arrows;

FIG. 11 is a fragmentary, essentially schematic, cross-sectional view of the upper part of air moving mechanism comprising another embodiment of this invention and showing structure presenting an air passage opening and a rotary fan in operable association with the structure wherein the blade tips of the fan are aligned with the opening defining edge of the structure;

FIG. 12 is a fragmentary, essentially schematic, cross-sectional view of the upper part of another embodiment of the invention similar to that shown in FIG. 11 but having the rotary fan located in disposition such that the blade tips are inside the opening defining structure and extending beyond the edge thereof for enhancing efficiency of the fan;

FIG. 13 is a fragmentary, essentially schematic, cross-sectional view of still another embodiment of the invention similar to those of FIGS. 11 and 12 but having the fan blades located outside of the structure and beyond the opening defining edge thereof;

FIG. 14 is a fragmentary, essentially schematic, cross-sectional view of a further embodiment of the invention like those shown in FIGS. 11-13 wherein a pair of planar members define the air passage opening and the blade tips of the rotary fan extend between the members for more effective fan operation.

FIG. 15 is a fragmentary, essentially schematic, cross-sectional view of an embodiment of the invention similar to FIG. 12 but employing a fan cylinder of the type shown in the tower of FIGS. 1-3;

FIG. 16 is a fragmentary, also generally schematic, cross-sectional showing of the upper part of a further embodiment of the invention wherein air enters the structure from only one side thereof and the air flow modifying apertured baffle is inclined from the horizontal to more effectively control air movement toward the outlet opening of the structure; and FIG. 17 is a fragmentary, essentially schematic, cross-sectional view of an embodiment of the invention similar to that of FIG. 16 but differing therefrom in that air enters the structure from opposite side thereof and the apertured air flow modifying baffle is configured to present a double incline facing toward respective air inlet to more precisely control air movement toward the outlet opening of the structure.

Air moving mechanism according to the preferred concepts of the invention is broadly designated by the numeral 20 in FIG. 1. This apparatus is especially useful in connection with cooling towers of either the wet or dry surface type. An evaporative-type water cooling tower generally identified by the numeral 22 is shown in FIG. 3, and includes a casing 24 made up of opposed side walls 26 and 28 centrally joined at the upper ends thereof by panel means comprising an upper panel 30 having air blocking depending opposed wall segments 32 and 34 which are parallel and span the distance between side walls 26 and 28 as is evident from FIGS. 2 and 3. A pair of open top hot water distribution basins 36 are carried at the upper end of the casing 24 on opposite sides of the air moving mechanism 20 outboard of wall segments 32 and 34 respectively, and serve to gravitationally deliver water to be cooled onto the upper plan area of respective parallelepiped shaped fill assemblies 38 and 40 respectively. Water leaving the lower ends of fill assemblies 38 and 40 is collected in cold water basin 42 underlying the entire plan area of casing 24. The inwardly and downwardly inclined inner faces of the fill assemblies 38 and 40 have vertically spaced, horizontally oriented eliminators 44 thereon which present respective inclined stacks that function to remove entrained water droplets from air passing through fill assemblies 38 and 40 toward the central plenum zone 46. The eliminators 44 are also transversely inclined upwardly as shown in FIG. 3 to enhance turning of air toward the inlet of air moving mechanism 20 and more uniformly distribute the air throughout the extent of plenum zone 46. Although cooling tower 22 has been shown as having opposed evaporative sections 38 and 40, it is to be appreciated that the invention hereof is useful for other applications involving only a single thermal interchange section as for example shown in FIGS. 9 and 10 to be described hereunder. Similarly, the fill assemblies 38 and 40 are shown schematically since they may be either of the splash or film type, or conceivably could be dry surface exchangers oriented substantially in the disposition of upright inclined eliminator stacks 44, in vertical planes or in a horizontal plane.

A baffle member 48 in the form of a planar sheet is provided at the top of casing 24 in overlying relationship to plenum zone 46 and extending between side walls 26 and 28 as well as the upper ends of the eliminator stacks 44. In fact, as shown in FIG. 3, baffle member 48 may comprise an extension of the perforated bottom walls of respective hot water distributors 36. It is also to be noted that the wall segments 32 and 34 projecting downwardly from panel 30 are joined to the upper surface of baffle member 48 in air sealing relationship thereto. The circular air inlet 50 which is coaxial with the central upright axis of plenum zone 46 is enclosed by a right circular fan cylinder 52 oriented to discharge hot air vertically back into the atmosphere. Fan 54 mounted within cylinder 52 and rotated about a vertical axis through gear reducer and motor means not shown, has a series of radial blades 56 each provided with a square tip 56a which just clears the inner surface of cylinder 52. In alternate construction not shown, the tip could be round. It is to be appreciated that the higher the fan efficiency, the lower the sound level. It is also to be noted from FIG. 3, that fan 54 is oriented such that a major part of the vertical extent of each of the blade tips 56a is contained within the tubular expanse of cylinder 52. It is also apparent from FIG. 3 that panel 30 is in a plane perpendicular to the axis of rotation of fan 54. The close spacing of blade tips 56 to the inner surface of cylinder 52 in substantial air sealing relationship thereto is believed to be an important factor in successful operation of air moving mechanism 20 utilizing an apertured baffle as the sole eased inlet defining means. As illustrated in other embodiments of this invention, various arrangements of the blade tip relative to the air outlet may be utilized to minimize air velocity losses at the tips of the rotary fan blades.

In the instance where air moving mechanism 20 is used for a cooling tower having air inlets on opposite sides of the tower casing, baffle member 48 is provided with an arcuate, somewhat square shaped orifice 58 therein which is coaxial with the axis of rotation of fan 54 and centrally located with reference to plenum zone 46 therebelow. As will be explained hereinafter, baffle member 48 is preferably located in predetermined disposition relative to the horizontal median plane of rotation of blades 56. Also, orifice 58 is of a predetermined size and shape to assure that air delivered to fan 54 is led into opening 50 and thereby cylinder 52 in such manner that no zone of the fan blade area is starved of access to incoming air.

If in this respect it is assumed that air moving mechanism 20 is to be employed for an evaporative-type cooling tower such as 22 wherein air is pulled into the interior of casing 24 for cross flow contact with water gravitating downwardly in corresponding opposed fill assemblies 38 and 40 and then allowed to enter plenum zone 46 before being pulled upwardly toward the air mover, it is preferred that orifice 58 be of the essentially noncircular configuration as best shown in FIGS. 2 and 8 of the drawings. As is most apparent from FIGS. 2 and 3, air flowing through the fill assemblies 38 and 40 cannot to any really significant extent commence movement toward the air discharge opening until leaving corresponding eliminator stacks 44. As a consequence, the airflow patterns from the fill assemblies 38 and 40 are essentially as depicted by the arrows A to D inclusive of FIG. 3. Airflow alongside the casing walls 26 and 28 is generally more direct to the fan. The same is true for air coming from the lower central part of the tower casing. Because of these different airflow patterns, it has now been unexpectedly found that configuring orifice 58 of the shape shown in FIGS. 2 and 8 modifies the air flowing toward the fan cylinder 52 or air outlet opening to an extent that there is even transition of such air into the outlet passage or opening notwithstanding the non-uniform direction of air toward baffle member 48.

In the case of a cooling tower where air comes in from two opposed sides of the casing, an optimized orifice 58 is thus defined by flattened arcuate end edge portions 58a and 58b on opposite sides of the axis 60 of fan 54. These edge portions are joined to opposed side edge portions 58c and 58d by respective corner edge portions 58e of greater arcuateness as is most evident from FIGS. 2 and 8. The lip portions of planar sheet member 48 defining edges 58a and 58b respectively, are spaced a greater distance from axis 60 than the lip portions presenting edges 58c and 58d. Edge portions 58e are of somewhat greater arcuateness than edge sections adjacent thereto as is most evident from FIGS. 2 and 8. The lip portions of planar sheet member 48 defining edges 58a and 58b respectively, are spaced a greater distance from axis 60 than the lip portions presenting edges 58c and 58d. Edge portions 58a and 58b are located above corresponding subzones 46a and 46b where airflow is more radial than adjacent casing side walls 26 and 28 to assure that cylinder 52 is filled uniformly with air around the entire perimeter thereof.

For best performance, baffle means 48 in the form of a planar sheet should be spaced from about 10% to approximately 50% of the diameter of fan cylinder 52 away from inlet 50 or of the fan opening if no cylinder is provided and sealed to the baffle means 48 by structure such as wall segments 32 and 34 which in conjunction with upper extensions of side walls 26 and 28 present a confined space 62 surrounding orifice 58. Best results are obtained when the spacing of planar member 48 is from about 10% to 20% of the fan cylinder diameter away from inlet 50 or the equivalent fan opening.

With particular reference to FIGS. 2 and 3, airflow through the left hand fill assembly 38 adjacent planar member 48 is designated by the arrows A which it can be seen are essentially radial with respect to the axis 60 of fan 54 before clearing the edge portion 58a of orifice 58 and then moving into fan cylinder 52 for discharge to the area 64 above tower 22 via the outlet opening 66 of fan cylinder 52. However, crossflowing air emanating from the lower part of fill assembly 38 adjacent the bottom region of eliminator stack 44 and depicted by the arrows designated D tends to flow toward fan 54 in a more axial direction than air path A, and as a consequence, the air from zone 46a being directed to the cylinder opening 50 from the lower part of the lefthand fill is almost coaxial with the axis of fan 54 as it enters the fan cylinder 52. Similarly, as air leaves the eliminators 44 in a direction from the top of the tower toward the bottom thereof, it tends to progressively assume a more axial direction from the radial path A as is indicated by the arrows B and C successively lower along the outlet face 68 of corresponding fill assembly 38 and 40. In accordance with the present invention, it has been determined that where airflow is predominantly axial, the orifice should be reduced. In areas where airflow is predominantly radial, the orifice should be increased. The shaping of orifice 58 may be accomplished mathematically using derived equations from performance figures, or optimized from empirical data wherein velocities near the inside wall of the cylinder 52 at its inlet 50 are measured and the orifice shaped until the values obtained are nearly equal at all angular locations. Test data in this connection may be generated by measuring the flow rate of air through cylinder 52, for example at points ½ in. inside the cylinder, 1 in. above cylinder inlet 50 and at locations evenly spaced around the circumference of the cylindrical enclosure.

Optimum shaping of orifice 58 and proper spacing of planar member 48 from cylinder opening 50 may be illustrated by the following example. Utilizing a fan cylinder having a diameter of 36.4 in., it was determined that the distance from sheet 48 to opening 50 should be about 5¾ in. based primarily on geometrical structural considerations. Using one 90° quadrant of cylinder 52 as a reference and starting from the 270° position (FIG. 8) and proceeding to the 360° position, 11¼° arcuate segments have been designated by the numerals (1) to (9) inclusive. If in the assumed structure the vertical height of the fill units 38 and 40 is about 40½ in. and the angle of each eliminator stack 44 is approximately 11.2° from the vertical with the individual eliminators thereby being at a 60° angle with respect to the horizontal, airflow toward the fan cylinder would be substantially along the lines depicted by arrows A, B, C and D respectively of FIG. 3. Also assuming a plenum chamber having an overall size of the order of 42¾ by 46 11/16 in horizontal cross-section, and with the distance between the lower ends of eliminators 44 being about 16 inches, best results obtain when the edge segments of orifice 58 at points (1) to (9) inclusive are spaced horizontally from adjacent vertical projections of cylinder opening 50 as follows: (1) 2.3 in.; (2) 2.55 in.; (3) 2.67 in.; (4) 2.61 in.; (5) 2.24 in.; (6) 1.55 in.; (7) 1.05 in.; (8) 0.61 in.; and (9) 0.36 in. These values were found to be optimum for any of a number of airflow rates through the test fill as defined.

In the operation of air moving mechanism 20, it is believed that special shaping of orifice 58 in baffle member 48 and location of the latter in predetermined relationship with respect to the opening 50 of fan cylinder 52 allows relatively uniform filling of the cylinder with air notwithstanding the fact that air from plenum 46 is traveling in an essentially radial direction toward the fan opening in parts of the chamber, while moving toward the opening 50 in a generally axial direction from other sections of the tower casing. Greater spacing of the orifice opening from the axis 60 in those areas where airflow is radial, as contrasted with more axial flow of air permits the apertured baffle 48 to modify the vena contracta of airflow to the cylinder, thus in effect functioning as an invisible eased inlet. Smooth airflow into cylinder 52 is assisted by the fact that air in the confined space 62 (see FIGS. 4 to 7 inclusive) is caused to rotate in a counter clockwise fashion at the points at which the sections are taken (viewing FIG. 2) which means that the air flow in the confined space 62 between orifice 58 and an adjacent segment of opening 50 is in the same direction as air delivered to the fan cylinder.

Because of the simplicity of the invisible eased inlet structure of this invention which comprises a planar plate with an optimally sized orifice therein configured to conform to operating parameters for a particular tower structure, it is possible to design a required orifice and to properly space it from the fan cylinder without regard to metal or reinforced resin shaping limitations heretofore imposed on design personnel. This is true whether or not the tower has air inlets on one, two or all four sides, and independent of the direction of discharge of the fan. For example, an evaporative water cooling tower of the small package type is illustrated in FIGS. 9 and 10 wherein casing 124 has an upright air inlet face 170 aligned with package fill 138 while the inclined face inlet louvers 172 are complementary with the outer inlet face 170. Double inclined eliminators 144 cover the inner outlet face 168 of the fill. A hot water distributor 136 overlies the upper end of fill 138 while the lower part of casing 124 serves as a cold water basin 142. Air moving structure 120 is mounted in the end wall of casing 124 opposite air inlet 170 and comprises a fan 154 rotatable within fan cylinder 152 projecting outwardly from upright end wall 130. Fan 154 has been illustrated as being of the propeller type having a series of blades 156, but it is to be appreciated that other types of air moving devices may be employed, as for example a centrifugal blower or a fan of the squirrel-cage type.

An upright baffle 148 mounted within casing 124 and comprising a sheet metal member spaced from wall 130, is provided with a special shaped generally rectangular orifice 158 having arcuate corners as illustrated in FIG. 10. In this instance, it is to be seen that the long axis of orifice 158 extends vertically to compensate for the radial flow of air along the upper and lower stretches of baffle member 148 as contrasted with the more axial flow of air toward the fan cylinder 152 at the sides of the casing 124 viewing FIG. 10. Orifice 158 is thus specially shaped to modify the vena contracta of air flowing into cylinder 152 and assures that supply thereof near the inside wall of the cylinder at its inlet is nearly equal at all angular locations around the circumference of the enclosure.

It is also to be appreciated that the results of this invention are not dependent on the provision of a fan cylinder in operable association with an air moving device such as a rotary fan. A vena contract modifying apertured baffle may also be used where the fan is simply positioned in a suitable fan opening in a wall, plate or other structure separating the zone from which air is to be removed from an area into which the air is to be discharged.

In the schematic illustration of FIG. 11 for example, air moving mechanism 220 includes structure 224 which has a panel 230 provided with a circular fan opening 250 therein. A rotary fan having a series of radially extending blades 256 is positioned for blade rotation inside of opening 250 with the tips 256a of the blades just clearing the edge of panel 230 defining opening 250. Baffle member 248 on structure 224 has an irregularly shaped orifice 258 therein sized and configured in the same manner as described with respect to baffle orifice 48. Circumscribing closure wall 232 prevents surrounding air from entering structure 224 between panel 230 and baffle member 248. The operation of mechanism 220 is identical with that previously described in connection with mechanism 20, noting only in this respect that air is discharged to the area surrounding structure 224 without passing through a cylinder associated with the fan.

In the variation 320 of the invention shown in FIG. 12, the fan blades 356 are located just inside of the fan opening 350 in panel 330 and the rotary fan is of a diameter causing the blade tips 356a to extend beneath the edge of the panel for somewhat better fan efficiency attributable to an improved air seal between the fan blades and the fan housing. Here again though baffle member 348 having an orifice 358 is located in proper airflow modifying-relationship to the fan and opening 350 therefore.

Mechanism 420 of FIG. 13 differs from that of mechanism 320 only in the location of the fan in disposition such that the blades 456 are outboard of the panel 430 above baffle 448 with the tips 456a overlying the opening defining edge of the panel for improved air sealing in the same manner as described with respect to mechanism 320.

In mechanism 520 shown in FIG. 14, a pair of spaced panels 530a and 530b are provided with cooperatively defined fan opening 550 above baffle 548. Blades 556 are located such that the tips 556a extend between panels 530a and 530b. It is preferred in this respect that the blade tips extend outwardly to an extent to overlap the edges of the panels presenting the fan openings 550 therein.

Mechanism 620 in FIG. 15 is illustrative of the fact that fan cylinder such as cylinder 652 may be used in association with rotary fan of any of the variations of the invention shown in FIGS. 12 and 14.

In FIG. 16, the casing 724 of air moving mechanism 720 is constructed for entrance of air only through the right hand side of the structure. This mono-flow unit therefore has only a single fill assembly 740 for passage of air therethrough before entering plenum 746 via eliminators 744. In this instance, the vena contracta controlling baffle member 748 provided with an orifice 758 is inclined at angle relative to the horizontal with the greater distance between the baffle and panel 730 provided with the fan opening 750 being adjacent the air inlet side of the structure. As a consequence, even though air enters the tower casing 720 from only one direction, modification of airflow toward the fan opening 750 receiving rotary fan 754 may still be optimized by proper sizing and shaping of orifice 758 in baffle 748.

Another form of dual flow tower is shown in FIG. 17 wherein casing 820 has air inlets on opposite sides thereof in the same manner as casing 24 of tower 20 in FIGS. 1–3. In this instance though, air entering plenum 846 from opposed fill assemblies is modified before passing to fan opening 850 in panel 830 by a baffle member 848 having inclined sections 848a and 848b defining an apex 848c at the central part of the casing intermediate fill assemblies 738 and 740. The orifice 858 defined by cut away segments in baffle member is still shaped and sized for optimum transition of airflow from plenum 846 to circular opening 850 in panel 830. It is also to be appreciated that the baffle member may be of conical shape overall for strength purposes and that an orifice of any required generally rectangular shape or otherwise may be provided therein.

Having thus described the invention, what is claimed as new and desired to be secured by Letters Patent is:

1. Air moving mechanism comprising:
   structure defining a restricted, generally circular opening for passage of air therethrough, said opening communicating with a plenum zone from which air is to be removed and leading to an area into which the air is to be discharged,
   said zone having a cross-sectional area transverse to the flow path of air therethrough which is larger than that of said opening and defined by a non-circular perimeter whereby throttling of the air must occur as it flows from all parts of the zone toward the opening in said structure and ultimate discharge to said area;
   means associated with said structure for removing air from said zone, increasing the velocity thereof as it flows toward and through said opening in the structure, and directing such air into the area;
   air throttling baffle means adjacent the opening in said structure in spaced relationship therefrom toward the zone and provided with a continuous edge surface defining a non-circular orifice larger than the opening and having an overall shape geometrically similar to that of said perimeter and through which the air from the zone must pass in flowing toward the opening in said structure, the edge portions of said baffle means being positioned to project into those regions of the zone where the air flow paths toward the opening from any boundary of the zone are non-parallel to the axis of the opening; and
   enclosure means operably associated with the structure and said baffle means for preventing area derived air from flowing to said opening without first passing through said zone and thence the orifice in said baffle means,
   said orifice defining edge surface of the baffle means being configured and arranged relative to said opening in the structure and the baffle means being positioned with respect to the opening in the structure in a location to cause air removed from said boundaries of the zone to follow non-linear transition paths between the baffle means and said opening which vary in angularity relatively to an extent that such boundary derived air not only assumes a generally circular pattern conforming to and substantially fills the opening as the air flows into the structure and is directed through the latter to said area but also enters the opening in generally parallel relationship to the axis thereof.

2. Mechanism as set forth in claim 1 wherein the air moving means comprises a rotary fan associated with the opening for moving air therethrough.

3. Mechanism as set forth in claim 2 wherein said structure includes a generally planar member having said opening therein, said rotary fan having a series of radially extending blades rotatable about an axis coaxial with the opening, the outer tips of said blades being rotatable through an arcuate path adjacent to and inside the edge of the opening.

4. Mechanism as set forth in claim 2 wherein said fan is provided with a series of blades each having a tip terminating in closely spaced, essentially air sealing relationship to the structure at said opening therein.

5. Mechanism as set forth in claim 2 wherein said structure includes a generally planar member having said opening therein, said rotary fan having a series of radially extending blades rotatable about an axis coaxial with the opening, said blades being located in dispositions and of respective lengths causing the tips thereto to rotate outside the edge of the opening but in proximal relationship to the member.

6. Mechanism as set forth in claim 5 wherein is provided means mounting the blades in disposition causing the tips thereof to rotate on the side of the member facing said area.

7. Mechanism as set forth in claim 5 wherein is provided means mounting the blades in disposition causing the tips thereof to rotate on the side of the member facing said baffle means.

8. Mechanism as set forth in claim 5 wherein said structure includes a pair of planar members in parallel spaced relationship, one of said members being provided with said opening therein located in facing relationship to the area, the other member having an opening therethrough in generally coaxial relationship to the opening in said one member, said rotary fan having a series of radially extending blades rotatable about an axis coaxial with said openings, and means mounting said blades in disposition and the blades being of respective lengths causing the tips thereof to rotate in the space between the members spaced axially outwardly from the edges of both of the openings.

9. Mechanism as set forth in claim 8 wherein said members are located in relative spaced relationship only slightly greater than the effective width of the blade tips rotating therebetween.

10. Mechanism as set forth in claim 2 wherein is provided means supporting said baffle means in non-coplanar relationship with a plane through the structure defining said opening therein thus causing the axis of the orifice to be at an angle relative to the axis of rotation of the rotary fan and the axis of the opening.

11. Mechanism as set forth in claim 2 wherein said zone includes a pair of opposed air inlets communicating with the opening, each of said air inlets having outer limits which are non-circular, said baffle means having a pair of sections in at least partial facing relationship to respective air inlets, said sections lying in respective planes which are at an angle with respect to each other and having cut away segments presenting lip portions which cooperatively define said orifice.

12. Mechanism as set forth in claim 1 wherein said baffle means is oriented to cause the orifice to be substantially coaxially aligned with the opening and lying in a plane generally parallel with a plane through said opening.

13. Mechanism as set forth in claim 1 wherein said enclosure means includes panel means extending outwardly in generally radially projecting relationship from said structure, the baffle means comprising a baffle member spaced from said panel means in a direction toward the zone, said enclosure means for preventing area air from bypassing the opening further comprising air blocking means surrounding said orifice and extending between said panel means and the baffle member.

14. Mechanism as set forth in claim 13 wherein said air blocking means comprises wall means between the panel means and said baffle member and having surfaces facing toward the axis of the orifice spaced outwardly from the orifice defining edge of the baffle member.

15. Mechanism as set forth in claim 14 wherein said air blocking wall means is spaced radially outwardly a sufficient distance from the orifice to permit air to enter the confined space surrounding said orifice between said baffle member, the structure and said wall means and to enhance transitional movement of air flowing from the zone toward said structure by rolling motion of air in said confined space which rotates in a direction with the part thereof next adjacent the orifice at any one time moving toward said opening and away from said orifice and away from said baffle member.

16. Mechanism as set forth in claim 1 wherein said structure is of generally cylindrical configuration presenting an essentially circular inlet opening facing said zone and an outlet leading to said area.

17. Mechanism as set forth in claim 1 wherein said zone has an air inlet located to one side of the axis of the opening, said orifice being of irregular configuration around the circumference thereof and defined in part by a first lip portion of said edge surface of the baffle means in greater spaced relationship from the axis of the orifice on the side thereof proximal to said air inlet than the orifice defining lip portions of the edge surface of the baffle means on each side of said first lip portion.

18. Mechanism as set forth in claim 1 wherein said zone has an air inlet located to one side of the axis of the opening, said orifice being of generally rectangular shape and having one flattened portion thereof defined by said edge surface located in generally aligned relationship with said air inlet and spaced from the axis of the orifice a greater distance than the portions of said edge surface on each side of said one edge surface portion.

19. Mechanism as set forth in claim 1 wherein said structure is provided an essentially circular air passage opening and the baffle means is spaced from the opening a distance that is from about 10% to about 50% of the diameter of said opening.

20. Mechanism as set forth in claim 1 wherein said structure is a right circular cylinder having an inlet and outlet and the baffle means is a sheet member spaced from the structure and lying in a plane essentially perpendicular to the axis of the cylinder, said sheet member having an inner edge defining said orifice and of continuous non-circular arcuate shape throughout the extent thereof.

21. Mechanism as set forth in claim 1 wherein said zone is provided with means therein causing certain currents of the air flowing therethrough from the perimeter of the zone to be directed toward the opening in said structure in generally parallel relationship to the axis of the opening and other currents of such air from teh zone to be directed toward respective perimeter segments of the opening generally radially of the axis of said opening, the orifice defining sections of said baffle means proximal to said certain currents of airflow from the zone being in closer spaced relationship to the axis of the opening than the orifice defining sections of the baffle means adjacent said other currents of the airflow from the zone.

22. Mechanism as set forth in claim 1 wherein means is provided in said zone on diametrically opposed sides of said opening in the structure for causing air removed from the zone and directed to the opening to emanate from two opposed, spaced, generally rectangular subzones, said orifice being of generally rectangular shape with the major extent thereof extending toward and overlying said subzones.

23. Mechanism as set forth in claim 22 wherein said subzones are provided with means therein inclined relatively with reference to one another and with respect to a plane through said opening causing the air emanating from those portions of the subzones in closest proximity to the opening to be directed toward the opening in a more radial direction relative to the axis of the opening than air emanating from parts of said subzones in greater-spaced relationship from the plane of the opening, said rectangular orifice having flattened but still somewhat arcuate side and end edge portions joined by arcuate corner edge portions of greater arcuateness than said end and side portions.

24. An induced draft water cooling tower having a fan unit provided with an invisible eased inlet for the fan cylinder thereof comprising:

a casing having an air inlet;

hot water distribution means at the upper part of the casing for gravitational delivery of water therefrom;

a cold water collection means at the bottom part of the casing;

fill means in the casing between the distribution means and said collection means;

a fan cylinder having an inlet and provided with a fan rotatable about the axis thereof for pulling air in through the fill means and then be discharged via said cylinder back into the atmosphere;

a baffle sheet member within said casing spaced ahead of the cylinder and provided with an orifice therein of slightly greater dimensions than said cylinder inlet for throttling the air flowing from the interior of the casing downstream of the fill means, toward the cylinder; and a sealing wall between said cylinder and the baffle sheet preventing air from entering the casing around the cylinder and forcing the air to flow through said cylinder during return to the atmosphere, said orifice being of generally rectangular configuration defining by side edges and end edges of only slightly arcuate shape joined by corner edges of greater arcuateness, said orifice being sized and shaped and the baffle sheet member being located relative to the air inlet of the cylinder to cause air directed toward the cylinder to substantially fill the inlet of the cylinder without air starvation around the perimeter thereof while flowing into the cylinder inlet in generally parallel relationship to the axis of the cylinder.

* * * * *